US010539177B2

(12) United States Patent
Soga

(10) Patent No.: US 10,539,177 B2
(45) Date of Patent: Jan. 21, 2020

(54) CYLINDRICAL ROLLER BEARING

(71) Applicant: NSK LTD., Tokyo (JP)

(72) Inventor: Shuji Soga, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/346,262

(22) PCT Filed: Nov. 14, 2017

(86) PCT No.: PCT/JP2017/040976
§ 371 (c)(1),
(2) Date: Apr. 30, 2019

(87) PCT Pub. No.: WO2018/088571
PCT Pub. Date: May 17, 2018

(65) Prior Publication Data
US 2019/0257354 A1 Aug. 22, 2019

(30) Foreign Application Priority Data
Nov. 14, 2016 (JP) .................................. 2016-221736

(51) Int. Cl.
*F16C 33/46* (2006.01)
*F16C 19/26* (2006.01)
(Continued)

(52) U.S. Cl.
CPC .............. *F16C 19/26* (2013.01); *F16C 33/54* (2013.01); *F16C 33/56* (2013.01);
(Continued)

(58) Field of Classification Search
CPC .. F16C 19/26; F16C 33/4605; F16C 33/4635; F16C 33/4676
See application file for complete search history.

(56) References Cited

U.S. PATENT DOCUMENTS 4,208,078 A * 6/1980 Miki ................... F16C 33/4635
29/898.061
5,716,146 A * 2/1998 Murai ..................... F16C 19/26
384/450
(Continued)

FOREIGN PATENT DOCUMENTS

JP 53-117859 U1 9/1978
JP 2000-274437 A 10/2000
(Continued)

OTHER PUBLICATIONS

International Search Report dated Jan. 23, 2018 by the International Searching Authority in counterpart International Patent Application No. PCT/JP2017/040976. (PCT/ISA/210).
(Continued)

*Primary Examiner* — Phillip A Johnson
(74) *Attorney, Agent, or Firm* — Sughrue Mion, PLLC

(57) ABSTRACT

The column portions of the cage includes roller holding portions which restrain the cylindrical roller on an outer diameter side and an inner diameter side thereof. The roller holding portions are formed such that a radial movement amount of the cage with respect to the cylindrical roller from a state where a revolution center of the cylindrical roller coincides with an axial center of the cage is configured so that an outer diameter side movement amount<an inner diameter side movement amount, and an outer diameter side opening width of the pocket portion>an inner diameter side opening width of the pocket portion. The column portion includes an inner diameter side protrusion which protrudes to an inner diameter side than inner circumferential surfaces of the annular portions and which configures the roller holding portions.

5 Claims, 8 Drawing Sheets

(51) Int. Cl.
*F16C 33/56* (2006.01)
*F16C 33/54* (2006.01)
(52) U.S. Cl.
CPC ...... *F16C 2208/40* (2013.01); *F16C 2208/52* (2013.01); *F16C 2208/60* (2013.01)

(56) References Cited

U.S. PATENT DOCUMENTS

| | | |
|---|---|---|
| 5,772,338 A | 6/1998 | Hillmann et al. |
| 6,715,927 B1 | 4/2004 | Torisawa et al. |
| 2015/0043862 A1 | 2/2015 | Kajikawa |

FOREIGN PATENT DOCUMENTS

| | | |
|---|---|---|
| JP | 2005-69282 A | 3/2005 |
| JP | 2006-144984 A | 6/2006 |
| JP | 2006-242284 A | 9/2006 |
| JP | 2009-97525 A | 5/2009 |
| JP | 2013-199955 A | 10/2013 |
| JP | 2014-159840 A | 9/2014 |
| JP | 2014-169746 A | 9/2014 |
| JP | 5749924 B2 | 7/2015 |

OTHER PUBLICATIONS

Written Opinion dated Jan. 23, 2018 by the International Searching Authority in counterpart International Patent Application No. PCT/JP2017/040976. (PCT/ISA/237).
Search Report dated Oct. 25, 2019 by the European Patent Office in counterpart European Patent Application No. 17869734.8.

* cited by examiner

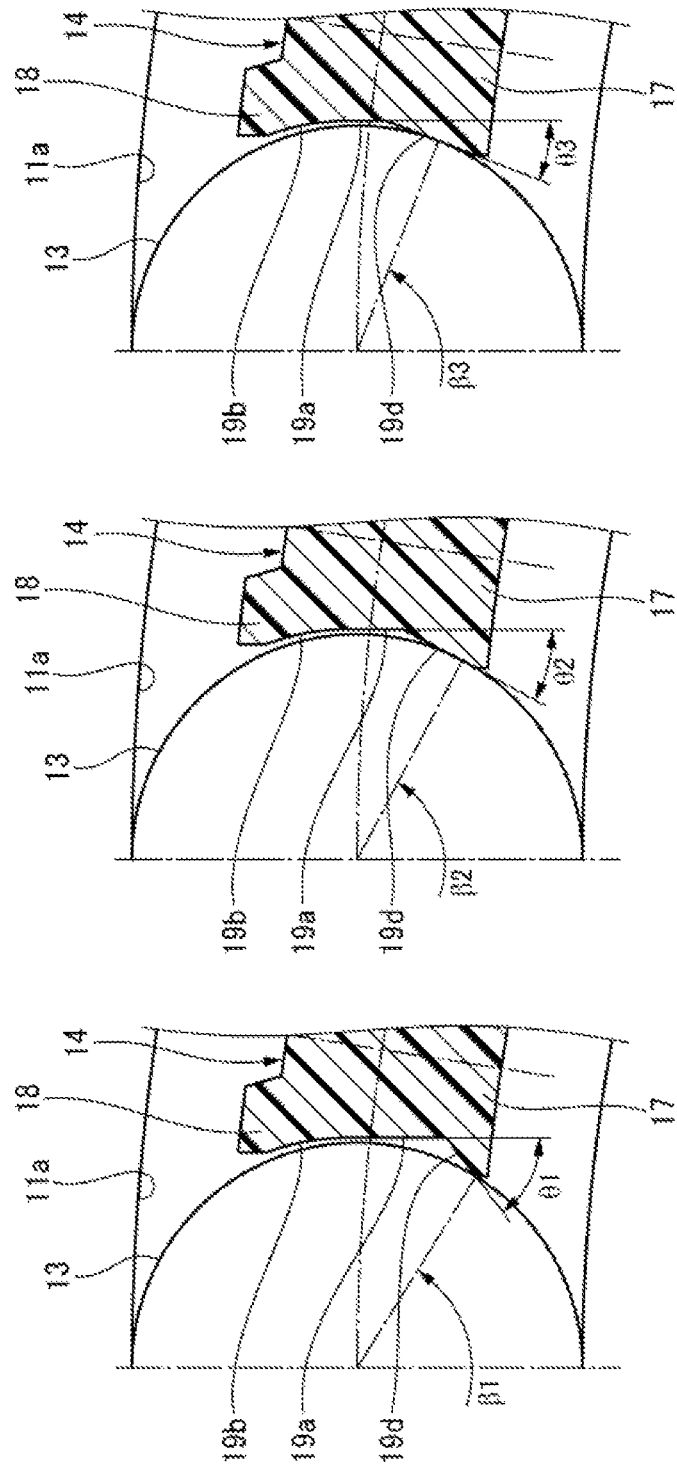

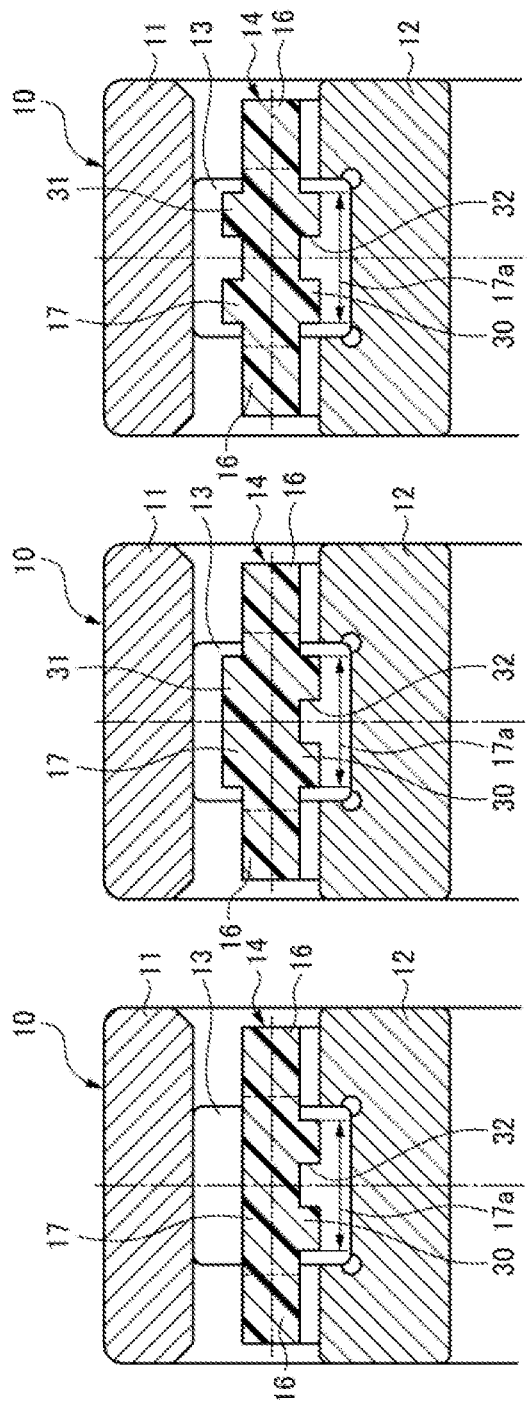

US 10,539,177 B2

CYLINDRICAL ROLLER BEARING

TECHNICAL FIELD

The present invention relates to a cylindrical roller bearing, and particularly to a cylindrical roller bearing suitable for a machine tool spindle.

BACKGROUND ART

A single-row cylindrical roller bearing used in a machine tool spindle is often used at high speed rotation (for example, dmN (=(inner diameter of bearing+outer diameter of bearing)/2×rotational speed (rpm)) is 350,000 to 700,000 or more) and under negative radial gap conditions. Under such severe use conditions, since a cage is subjected to a force due to mutual sliding with a roller, an outer ring guide type cage may be used.

However, when the outer ring guide type cage is used, if the lubrication of a guide surface is insufficient, wear occurs in a contact portion between the cage and a outer ring, and there is a possibility that the bearing is damaged. Further, when assembly is performed in a positive radial gap due to variations in installation conditions, the roller may be easily skewed or tilted, and the generation of squeak noise and wear between an inner ring flange surface and a roller end surface due to revolution slip and the like may occur.

Therefore, various roller guide type cages in which wear does not occur between the cage and the bearing ring are known (for example, see Patent Literatures 1 to 3).

For example, in the cylindrical roller bearing described in Patent Literature 1, an outer diameter restraint type cage is disposed. The cage is made of a synthetic resin and prevents forced drawing upon release of a product from a mold for injection molding during resin cage molding and prevents the roller from biting into column portions of the cage. Since a guide gap expands due to centrifugal expansion and thermal expansion during operation, the outer diameter restraint type cage is suitable for a certain high-speed use condition without excessive contact with the roller. When the assembly is performed in the positive radial gap, the roller during operation is pressed to an outer ring side by centrifugal force, an act from an pocket opening portion (roller guide portion) to an inner ring side is pressed by the outer diameter restraint type cage, irregular movement (in particular, skew movement) of rolling elements caused by the positive radial gap is restricted, and it is effective in suppressing the squeak noise and suppressing the wear between the inner ring flange surface and the end surface.

CITATION LIST

Patent Literature

Patent Literature 1: JP-A-2005-69282
Patent Literature 2: JP-A-2013-199955
Patent Literature 3: JP-A-2000-274437

SUMMARY OF INVENTION

Problem to be Solved

From a viewpoint of preventing forced drawing during resin cage molding and from a viewpoint of insertability of the roller from an outer diameter side opening portion of the cage, the outer diameter restraint type cage as in Patent Document 1 cannot make a roller holding angle smaller than a certain value. On the other hand, when the roller holding angle is large, the roller easily bites into the column portions of the cage in the wedge shape under high speed conditions, and thus high-speed performance is determined by the roller holding angle.

The present invention has been made in view of the above-described problems, and an object thereof is to provide a cylindrical roller bearing capable of suppressing generation of squeak noise and wear of a roller end surface and wear of an inner ring flange surface at low speed, and preventing the roller from biting into column portions of the cage in a wedge shape at a high speed.

Solution to Problem

The above object of the present invention is achieved by the following configurations.

(1) A cylindrical roller bearing includes:
an outer ring having an outer ring raceway surface formed on an inner circumferential surface:
an inner ring having an inner ring raceway surface formed on an outer circumferential surface and a flange portion formed on an axial end portion of the inner ring raceway surface;
a plurality of cylindrical rollers rollably disposed between the outer ring raceway surface and the inner ring raceway surface; and
a resin cage used in a roller guide type including a pair of annular portions and a plurality of column portions which axially connect the pair of annular portions and forming a plurality of pocket portions which rotatably hold the plurality of cylindrical rollers respectively,
wherein the column portions of the cage includes roller holding portions which restrain the cylindrical roller on the outer diameter side and the inner diameter side thereof,
wherein the roller holding portions are formed such that for a radial movement amount of the cage with respect to the cylindrical roller, an outer diameter side movement amount<an inner diameter side movement amount, and an outer diameter side opening width of the pocket portion>an inner diameter side opening width of the pocket portion from a state where a revolution center of the cylindrical roller coincides with an axial center of the cage, and
wherein the column portion includes an inner diameter side protrusion which protrudes further to an inner diameter side than inner circumferential surfaces of the annular portions and configures the roller holding portions.

(2) In the cylindrical roller bearing according to (1), sums A+L and B+L of the respective distances A and B from both axial end surfaces of the pocket portion to the inner diameter side protrusion and a width L of the inner diameter side protrusion are shorter than an axial width C of the cylindrical roller, (3) In the cylindrical roller bearing according to (1) or (2), an inner surface of the roller holding portion is configured in a concave shape with a single circular arc.

(4) In the cylindrical roller bearing according to (1) or (2), a flat surface passing through a pitch circle diameter position of the cylindrical roller is formed on the inner surface of the roller holding portion, and a concave circular arc surface or a tapered surface inclined with respect to the flat surface is formed more on the outer diameter side and the inner diameter side than the flat surface.

(5) In the cylindrical roller bearing according to (4), the concave arc surface is formed on the outer diameter side and the inner diameter side of the flat surface, and a curvature radius of the circular arc surface on the inner diameter side is larger than a curvature radius of the circular arc surface on the outer diameter side.

Effects of Invention

According to the cylindrical roller bearing of the present embodiment, the column portions of the cage include roller holding portions which restrain the cylindrical roller on the outer diameter side and the inner diameter side thereof. The roller holding portions are formed such that for the radial movement amount of the cage with respect to the cylindrical roller, the outer diameter side movement amount<the inner diameter side movement amount, and the outer diameter side opening width of the pocket portion>the inner diameter side opening width of the pocket portion from the state where the revolution center of the cylindrical roller coincides with the axial center of the cage, and the column portion includes the inner diameter side protrusion which protrudes further to the inner diameter side than the inner circumferential surfaces of the annular portions and configures the roller holding portions. Accordingly, the cylindrical roller is guided on the outer diameter side of the column portion at low speed, the skew of the cylindrical roller is suppressed, and effects of preventing roller end surface wear, inner ring flange surface wear, and squeak noise are obtained. Further, since the cylindrical roller is guided on the inner diameter sides of the column portions having the opening width narrowed by the inner diameter side protrusion by the thermal expansion and the centrifugal expansion of the cage at high speed, the cylindrical roller can be prevented from biting into the column portions of the cage by the roller holding angle on the relatively narrow inner diameter side.

BRIEF DESCRIPTION OF DRAWINGS

FIGS. 7A to 7C are views showing a relationship between a taper angle and a wedge angle of a tapered surface of a roller holding portion according to a third embodiment.

FIGS. 10A to 10C are cross-sectional views of a main part of a cylindrical roller bearing according to fifth to seventh modifications of the present invention.

DESCRIPTION OF EMBODIMENTS

Hereinafter, a cylindrical roller bearing according to each embodiment of the present invention will be described in detail with reference to the drawings.

First Embodiment

Figure 1:
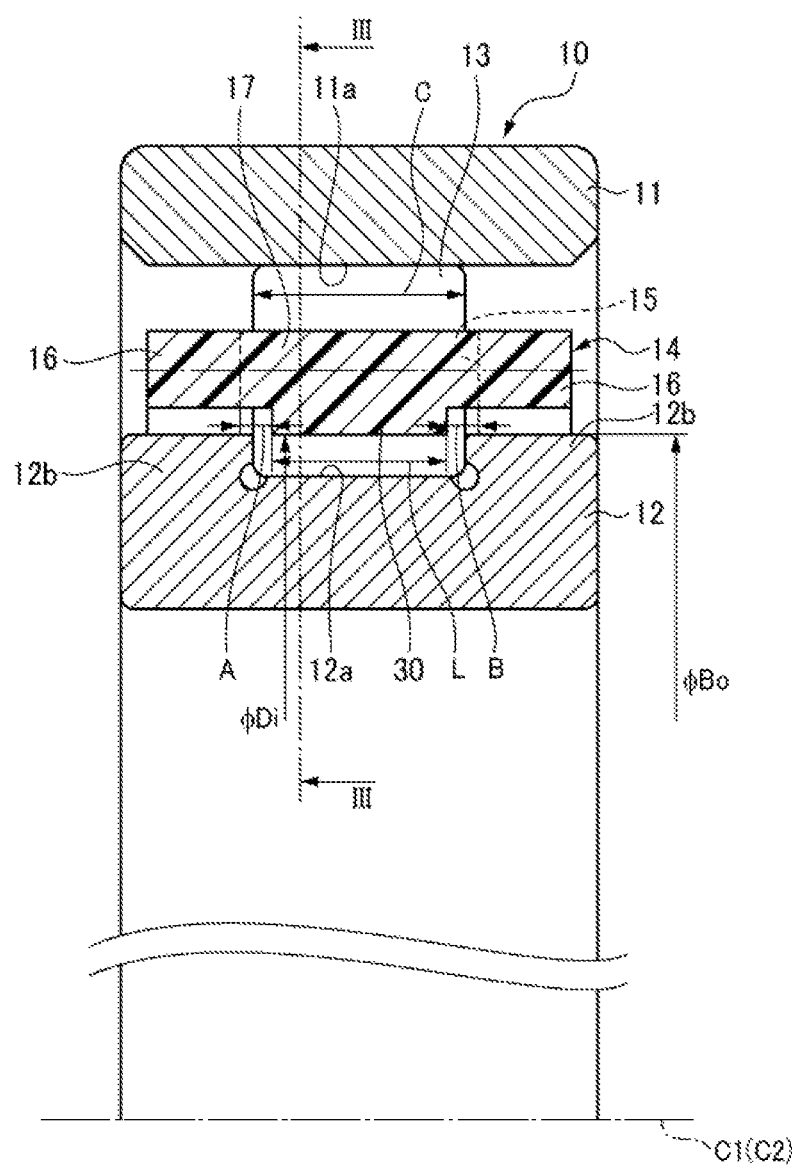
FIG. 1 is a longitudinal cross-sectional view showing a cylindrical roller bearing according to a first embodiment of the present invention.
Figure 2:
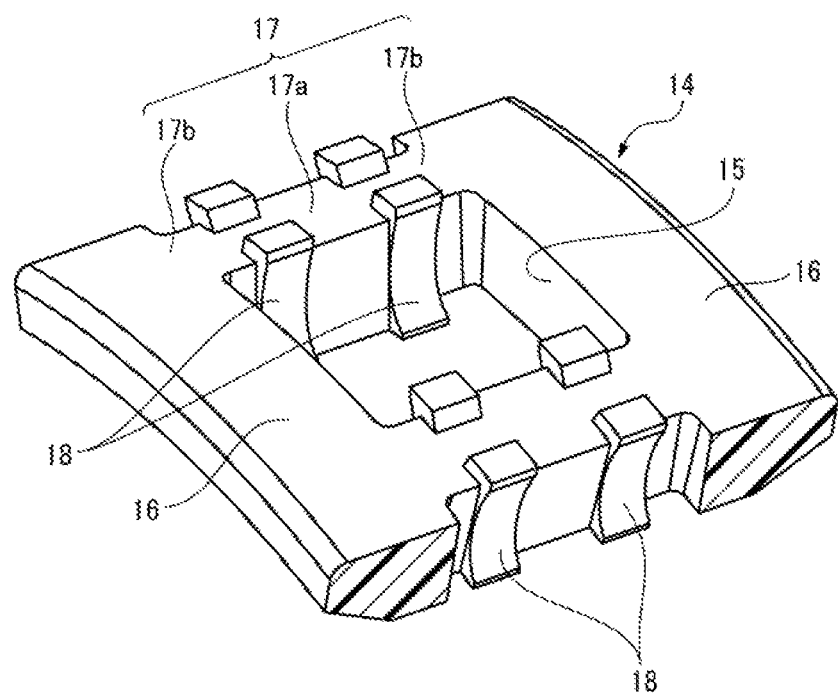
FIG. 2 is a perspective view of a main part of a cage for the cylindrical roller bearing of FIG. 1.

As shown in FIG. 1, a cylindrical roller bearing 10 includes an outer ring 11 having an outer ring raceway surface 11a formed on an inner circumferential surface, an inner ring 12 having an inner ring raceway surface 12a formed on an outer circumferential surface, a plurality of cylindrical rollers 13 rollably disposed between the outer ring raceway surface 11a and the inner ring raceway surface 12a, and a roller guide type resin cage 14 forming a plurality of pocket portions 15 which rotatably hold the plurality of cylindrical rollers 13 respectively. The inner ring 12 includes flange portions 12b, 12b at both axial end portions of the inner ring raceway surface 12a.

The cylindrical roller bearing 10 may be lubricated with any lubricant of lubricating oil and grease.

The resin cage 14 is made of a synthetic resin material such as polyamide, polyacetal, polyether ether ketone, polyimide, and polyphenylene sulfide, and if necessary, a reinforcing material such as a glass fiber, a carbon fiber, and a aramid fiber may be added to the resin.

As shown in FIGS. 1 to 4B, the resin cage 14 includes a pair of annular portions 16, 16, and a plurality of column portions 17 axially connecting the pair of annular portions 16, 16. An axially intermediate portion 17a of the column portion 17 includes a pair of roller holding portions 18, 18 disposed so as to be spaced apart from each other in an axial direction. The pair of roller holding portions 18, 18 has a predetermined axial length and is formed so as to protrude in a circumferential direction more than a side surface of the column portion 17 located therebetween. In this way, the pair of roller holding portions 18, 18 formed by being divided in the axial direction can be elastically deformed upon receiving a force generated by mutual sliding with the cylindrical roller 13, and can release a part of a force received by the column portion 17.

Inner surfaces of the roller holding portions 18, 18 on the outer diameter side and the inner diameter side protrude circumferentially toward a center of the pocket portions 15, and restrain the cylindrical rollers 13 on the outer diameter side and the inner diameter side thereof.

The roller holding portions 18, 18 are formed such that a radial movement amount of the cage 14 with respect to the cylindrical roller 13 from a state where a revolution center C1 of the cylindrical roller 13 coincides with an axial center C2 of the cage 14 is configured so that an outer diameter side movement amount is smaller than an inner diameter side movement amount.

Figure 3:
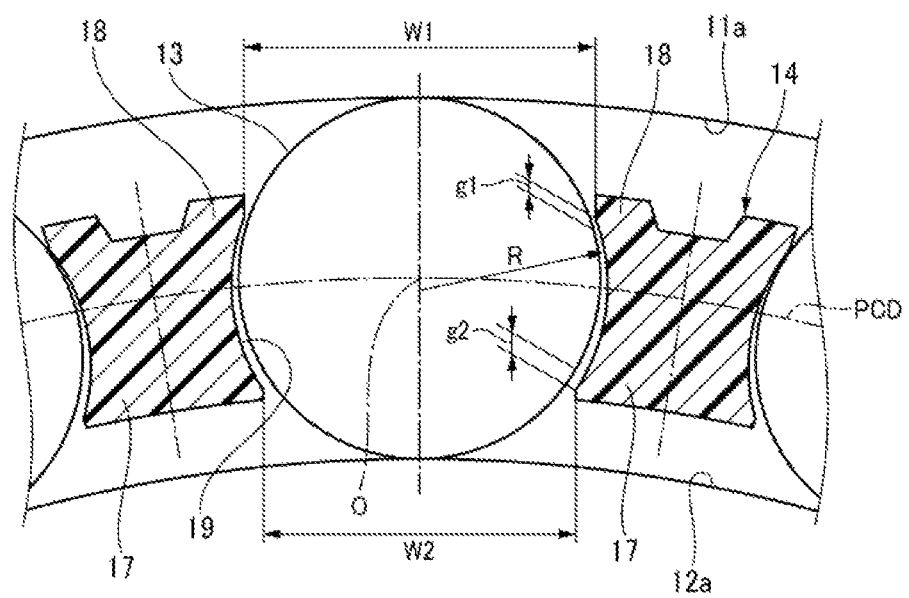
FIG. 3 is a cross-sectional view taken along a line of FIG. 1 showing a cylindrical roller and the cage.

That is, as shown in FIG. 3, the outer diameter side movement amount and the inner diameter side movement amount from the state where the revolution center C1 of the cylindrical roller 13 coincides with the axial center C2 of the cage 14 respectively correspond to an outer diameter side gap g1 and an inner diameter side gap g2 along a radial direction between the roller holding portion 18 and the cylindrical roller 13 located on a pitch circle diameter PCD. Therefore, in the present embodiment, the inner diameter side gap g2 is designed to be larger than the outer diameter side gap g1.

Specifically, in the state where the revolution center C1 of the cylindrical roller 13 coincides with the axial center C2 of the cage 14, the inner surfaces of the roller holding portions 18, 18 are concaved shape with a single curvature radius R which has a center on an inner side with respect to a center O of the cylindrical roller 13 located on the pitch circle diameter PCD. Accordingly, the above relationship between the outer diameter side gap g1 and the inner diameter side gap g2 is given.

An inner diameter side opening width W2 of the pocket portion 15 is designed to be narrower than an outer diameter side opening width W1 of the pocket portion 15 by the roller holding portions 18, 18 (outer diameter side opening width W1>inner diameter side opening width W2).

Further, in the present embodiment, as shown in FIG. 1, an axially intermediate portion 17a including the pair of roller holding portions 18, 18 includes an inner diameter side protrusion 30 which protrudes to an inner diameter side than both axial end portions 17b of the column portion 17 located axially outer side than the pair of roller holding portions 18, 18 and the annular portions 16, 16.

Figure 4A:
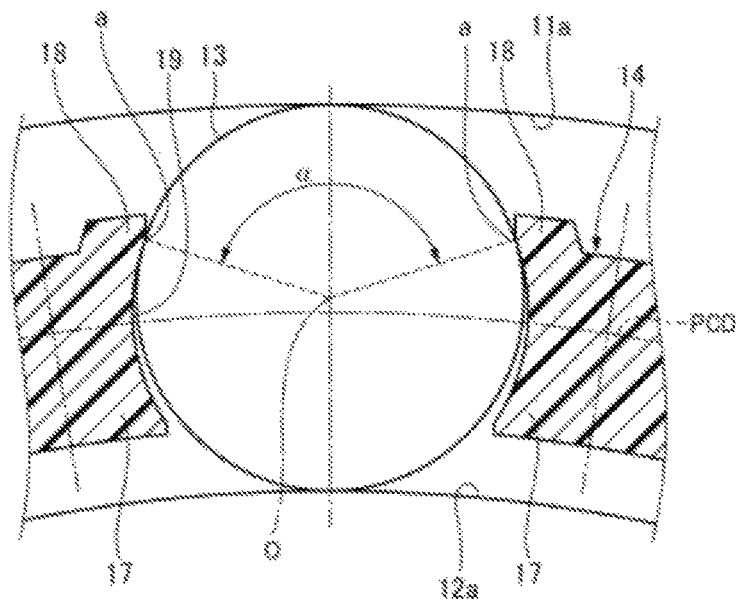
FIG. 4A is a cross-sectional view showing a state in which the cylindrical roller is restrained at an outer diameter side of a roller holding portion.
Figure 4B:
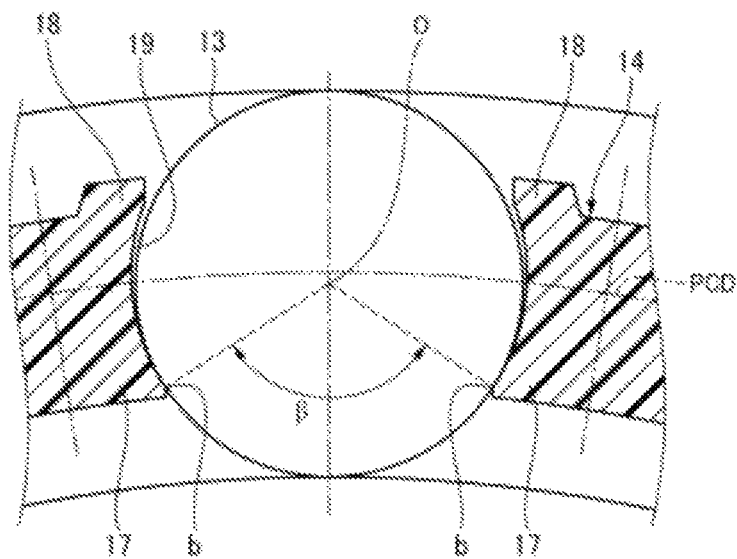
FIG. 4B is a cross-sectional view showing a state in which the cylindrical roller is restrained at an inner diameter side of the roller holding portion.

According to such a configuration, as shown in FIGS. 4A and 4B, a roller holding angle β on the inner diameter side can be designed to be smaller than a roller holding angle α on the outer diameter side. The roller holding angle refers to an angle at which line segments connecting contact points where the pair of column portions 17, 17 is brought into contact with the cylindrical roller 13 to the center O of the cylindrical roller 13 intersect when the cage 14 and the cylindrical roller 13 move relatively in the radial direction.

In the cylindrical roller bearing 10 at a low speed, the cylindrical roller 13 is guided on the outer diameter side of the column portion 17, since the skew of the cylindrical roller 13 is suppressed, the wear of a roller end surface, the wear of the inner ring flange surface, and the generation of squeak noise are suppressed. It should be noted that a phenomenon in which the cylindrical roller 13 bites into the column portions 17 in a wedge shape due to a large roller holding angle α on the outer diameter side is not a problem because the cylindrical roller 13 is in a low speed. Here, a contact portion a between the cylindrical roller 13 and each of the roller holding portions 18, 18 is an edge-contact.

Further, at a high speed of a predetermined rotation speed or more (dmn 35,000 to 70,000 or more), the cage 14 is relatively expanded by thermal expansion and centrifugal expansion, so that the cylindrical roller 13 is guided on an inner diameter side of the column portion 17 having a narrow opening width. Accordingly, inner surfaces on the outer diameter side of the roller holding portions 18, 18 serve as non-guiding surfaces. The relatively small roller holding angle β on the inner diameter side can prevent the cylindrical roller 13 from biting into the column portions 17 of the cage 14 in a wedge shape on the inner surfaces on the inner diameter side. Here, a contact portion b between the cylindrical roller 13 and each of the roller bearing portions 18, 18 is an edge-contact.

An inner diameter φDi of the inner diameter side protrusion 30 is preferably smaller in order to reduce the roller holding angle β. On the other hand, from a viewpoint of assemblability of the cylindrical roller bearing 10, an inner diameter of the cage 14, that is, an inner diameter φDi of the inner diameter side protrusion 30 is designed to be larger than an outer diameter φBo of the flange portion 12b of the inner ring 12 (φBo<φDi). However, even if the cage 14 and the cylindrical roller 13 move in the radial direction relative to each other during operation, it is necessary to prevent the cage 14 from coming into contact with the inner ring 12.

Therefore, as shown in FIG. 1, sums A+L and B+L of respective distances A and B from both axial end surfaces of the pocket portion 15 to the inner diameter side protrusion 30 and a width L of the inner diameter side protrusion 30 are designed to be shorter than an axial width C of the cylindrical roller 13 (A+L<C and B+L<C). Accordingly, a contact between the inner diameter side protrusion 30 and the flange surface of the inner ring 12 is prevented.

Further, the inner diameter side of the column portion 17 of the cage 14 is not forcibly drawn out at the time of molding, and does not interfere with roller insertion at the time of bearing assembly. Specifically, when the cage 14 is manufactured in injection molding, in the molding die, each mold member for forming each pocket is radially extracted toward a radial direction outer side at the time of mold releasing after molding (so-called radial draw type). Therefore, an inner diameter side of the roller holding portion 18 protruding toward a pocket center side is not forcibly drawn out. Further, when the cylindrical roller 13 is inserted into the pocket portions 15 of the cage 14, since the cylindrical roller 13 is inserted into the pocket portions 15 from an outer diameter side opening portion, similarly, the inner diameter side of the roller holding portion 18 is not relevant.

As described above, according to the cylindrical roller bearing 10 of the present embodiment, the column portion 17 of the cage 14 includes roller holding portions 18, 18 which restrain the cylindrical roller 13 on the outer diameter side and the inner diameter side thereof. The roller holding portions 18, 18 are formed such that the radial movement amount of the cage 14 with respect to the cylindrical roller 13 from the state where the revolution center C1 of the cylindrical roller 13 coincides with the axial center C2 of the cage 14 is configured so that the outer diameter side movement amount<the inner diameter side movement amount, and the outer diameter side opening width W1 of the pocket portion 15>the inner diameter side opening width W2 of the pocket portion 15. The column portion 17 includes the inner diameter side protrusion 30 which protrudes further to the inner diameter side than the inner circumferential surfaces of the annular portions 16, 16 and configures the roller holding portions 18, 18. Accordingly, at low speed, the cylindrical roller 13 is guided on the outer diameter side of the column portion 17, the skew of the cylindrical roller 13 is suppressed, and effects of roller end surface wear prevention, inner ring flange surface wear prevention, and squeak noise prevention are obtained. Further, at high speed, since the cylindrical roller 13 is guided on the inner diameter sides of the column portions 17 having the opening width W2 narrowed by the thermal expansion and the centrifugal expansion, the roller holding angle β on the relatively narrow inner diameter side can prevent the cylindrical roller 13 from biting into the column portions 17 of the cage 14.

Since the sums A+L and B+L of the respective distances A and B from both axial end surfaces of the pocket portion 15 to the inner diameter side protrusion 30 and the width L of the inner diameter side protrusion 30 are designed to be shorter than the axial width C of the cylindrical roller 13 (A+L<C and B+L<C), the contact between the inner diameter side protrusion 30 and the flange surface of the inner ring 12 is prevented during an operation.

Further, since inner surfaces 19 of the roller holding portions 18, 18 are formed in a concave shape with a single arc, the effects described above can be achieved with a shape having good processability.

Second Embodiment

Figure 5:
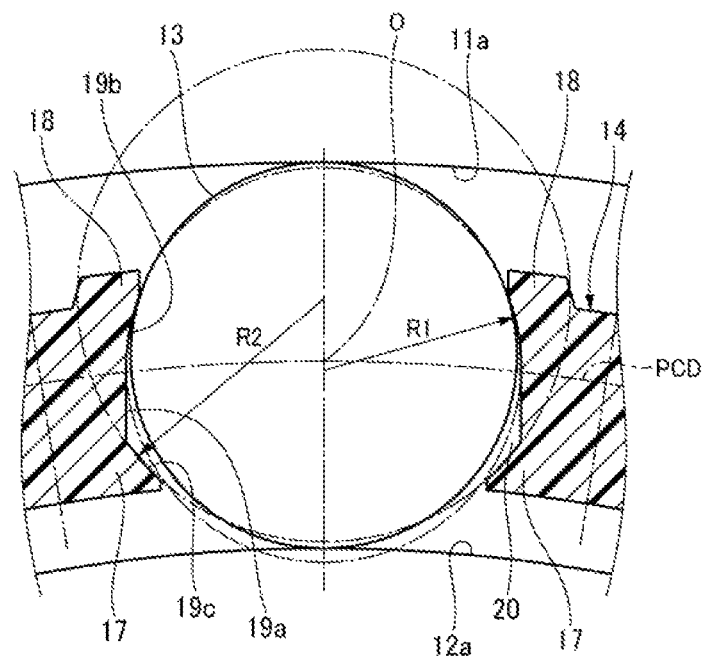
FIG. 5 is a cross-sectional view corresponding to FIG. 3 showing a cylindrical roller bearing according to a second embodiment of the present invention.

FIG. 5 is a cross-sectional view showing a cylindrical roller and a cage in a cylindrical roller bearing according to the second embodiment. In the present embodiment, the shape of the inner surface 19 of each of the roller holding portions 18, 18 is different from that of the first embodiment.

In the second embodiment, the inner surface 19 of each of the roller holding portions 18, 18 includes a flat surface 19a passing through the pitch circle diameter PCD position of the cylindrical roller 13 and concave circular arc surfaces 19b, 19c formed on the outer diameter side and the inner diameter side of the flat surface 19a.

In the state where the revolution center C1 of the cylindrical roller 13 coincides with the axial center C2 of the cage 14, the circular arc surface 19b on the outer diameter side is concaved shape with a curvature radius R1 which has a center on the inner side with respect to the center O of the cylindrical roller 13 located on the pitch circle diameter PCD. In the state where the revolution center C1 of the cylindrical roller 13 coincides with the axial center C2 of the cage 14, the circular arc surface 19C on the inner diameter side is concaved shape with a curvature radius R2 which has a center on the outer side with respect to the center O of the cylindrical roller 13 located on the pitch circle diameter PCD. Further, in order to make the roller holding angle β on the inner diameter side small, the curvature radius R2 of the circular arc surface 19c on the inner diameter side is larger than the curvature radius R1 of the circular arc surface 19b on the outer diameter side. Accordingly, a lubricating reservoir 20 is formed in the vicinity of a connecting portion between the flat surface 19a and the circular arc surface 19c, and the effect of improving the lubrication life is obtained.

The second embodiment where in the roller holding portions 18, 18 have the above inner surfaces 19 is the same as the first embodiment in that (i) the radial movement amount of the cage 14 with respect to the cylindrical roller 13 from the state where the revolution center C1 of the cylindrical roller 13 coincides with the axial center C2 of the cage 14 is configured so that the outer diameter side movement amount<the inner diameter side movement amount, and the outer diameter side opening width W1 of the pocket portion 15>the inner diameter side opening width W2 of the pocket portion 15, and (ii) the column portion 17 includes the inner diameter side protrusion 30 which protrudes to the inner diameter side than the inner circumferential surfaces of the annular portions 16, 16 and the column portion 17 configures the roller holding portions 18, 18. The same effects as the first embodiment can be obtained in the second embodiment.

Third Embodiment

Figure 6:
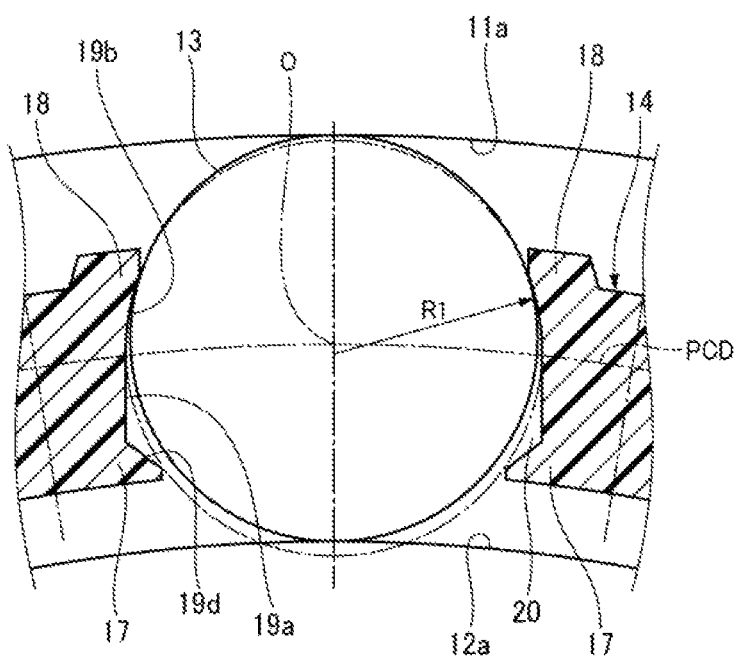
FIG. 6 is a cross-sectional view corresponding to FIG. 3 showing a cylindrical roller bearing according to a third embodiment of the present invention.

FIG. 6 is a cross-sectional view showing a cylindrical roller and a cage in a cylindrical roller bearing according to the third embodiment. In the present embodiment, the shape of the inner surface 19 of each of the roller holding portions 18, 18 is different from that of the first embodiment.

In the third embodiment, the inner surface 19 of each of the roller holding portions 18, 18 includes the flat surface 19a passing through the pitch circle diameter PCD position of the cylindrical roller 13, a concave circular arc surfaces 19b formed on the outer diameter side of the flat surface 19a, and a tapered surface 19d formed on the inner diameter side of the flat surface 19a.

In the state where the revolution center C1 of the cylindrical roller 13 coincides with the axial center C2 of the cage 14, the circular arc surface 19b on the outer diameter side is concave shape with the curvature radius R1 which has center on the inner side with respect to the center O of the cylindrical roller 13 located on the pitch circle diameter PCD. The tapered surface 19d on the inner diameter side is inclined toward the center of the pocket portion 15 with respect to the flat surface 19a. Accordingly, in the present embodiment, the lubricating reservoir 20 is also formed in the vicinity of a connecting portion between the flat surface 19a and the tapered surface 19d, and the effect of improving the lubrication life is obtained.

A tapered angle θ of the tapered surface 19d with respect to the flat surface 19a may be adjusted to be smaller than an angle θ1 (see FIG. 7A) at which the tapered surface 19d is edge-contacted with the cylindrical roller 13 and larger than an angle θ3 (see FIG. 7C) at which the cylindrical roller 13 bites into the column portion 17. Further, the tapered angle θ corresponds to a roller holding angle β on the inner diameter side, and as shown in FIGS. 7A to 7C, when the tapered angle is θ1>θ2>θ3, the roller holding angle β is β1<β2<β3.

The third embodiment where in the roller holding portions 18, 18 have the above inner surfaces 19 is the same as the first embodiment in that (i) the radial movement amount of the cage 14 with respect to the cylindrical roller 13 from the state where the revolution center C1 of the cylindrical roller 13 coincides with the axial center C2 of the cage 14 is configured so that the outer diameter side movement amount<the inner diameter side movement amount, and the outer diameter side opening width W1 of the pocket portion 15>the inner diameter side opening width W2 of the pocket portion 15, and (ii) the column portion 17 includes the inner diameter side protrusion 30 which protrudes to the inner diameter side than the inner circumferential surfaces of the annular portions 16, 16 and the column portion 17 configures the roller holding portions 18, 18. The same effects as the first embodiment can be obtained in the third embodiment.

The present invention is not limited to the above-described embodiment and may be appropriately modified, improved, or the like.

For example, the shape of the axially intermediate portion 17a of the column portion 17 is deformable as shown in FIGS. 8 to 10.

Figure 8A:
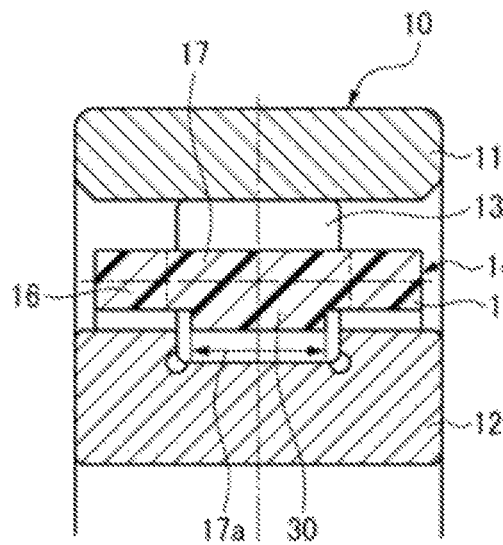
FIGS. 8A and 8B are cross-sectional views of a main part of a cylindrical roller bearing according to first and second modifications of the present invention.
Figure 8B:
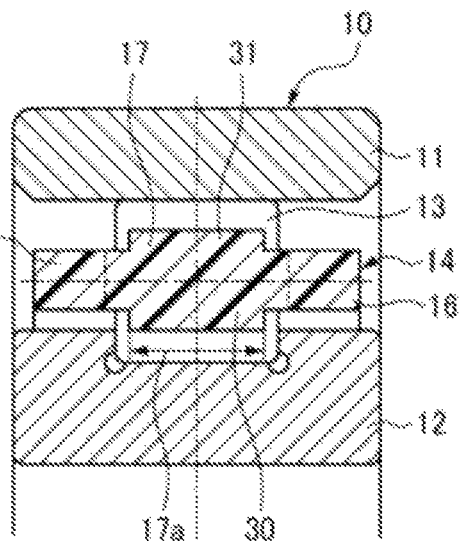

That is, as shown in FIG. 8A, the axially intermediate portion 17a of the column portion 17 may only include the inner diameter side protrusion 30, and as shown in FIG. 8B, the axially intermediate portion 17a of the column portion 17 may include the inner diameter side protrusion 30 and an outer diameter side protrusion 31 protruding to the outer diameter side.

Figure 9A:
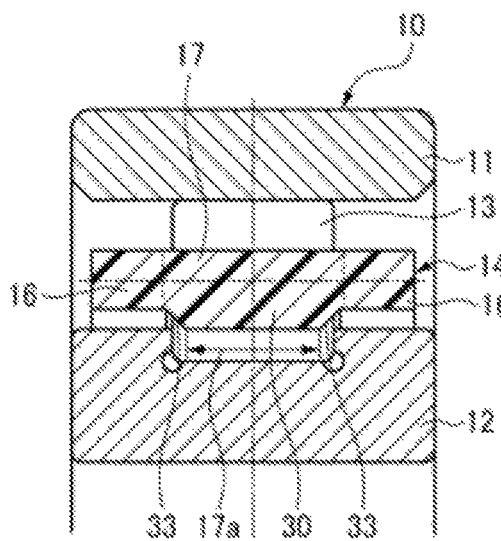
FIGS. 9A and 9B are cross-sectional views of a main part of a cylindrical roller bearing according to third and fourth modifications of the present invention.
Figure 9B:
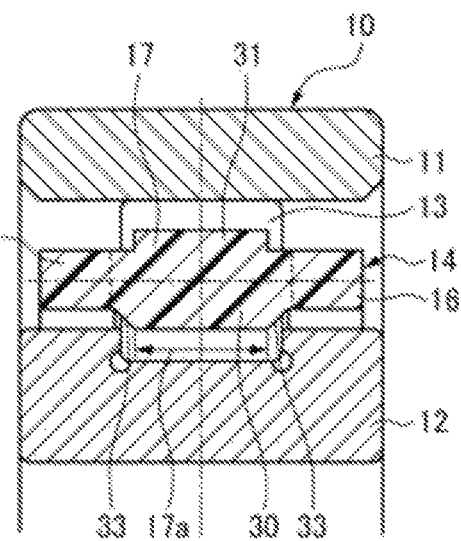

Further, as shown in FIGS. 9A and 9B, both axial end surfaces of the inner diameter side protrusion 30 may be tapered surfaces 33, 33, and thus stress concentration of the force acting on the inner diameter side protrusion 30 can be relaxed, and the oil supply and discharge property of the lubricant can be improved.

Further, as shown in FIGS. 10A and 10B, the inner diameter side protrusion 30 protruding toward the inner diameter side may be formed to be spaced apart in the axial direction, and as shown in FIG. 10C, both of the inner diameter side and outer diameter side protrusions 30, 31 protruding toward the inner diameter side and the outer diameter side may be formed spaced apart from each other in the axial direction. Particularly, a relief portion 32 formed between the plurality of axially separated protrusions 30, 30 on the inner diameter side holds the lubricant in the circumferential direction of the column portion 17 and contributes to lubricity.

Figure 11A:
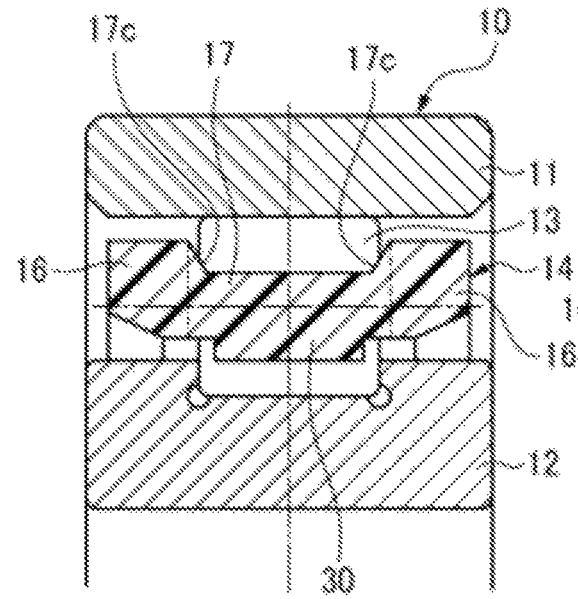
FIGS. 11A and 11B are cross-sectional views of a main part of a cylindrical roller bearing according to eighth and ninth modifications of the present invention.
Figure 11B:
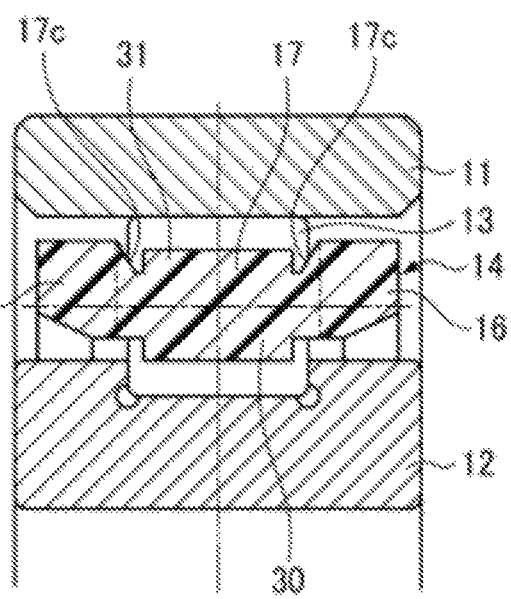

As shown in FIGS. 11A and 11B, the strength of the cage 14 may be increased by increasing the radial thickness of the annular portions 16, 16. Specifically, in the case of the modification shown in FIG. 11A, the outer circumferential surfaces of the annular portions 16, 16 may be larger than the outer diameter of the column portion 17 (roller holding portion 18), and in the case of the modification shown in FIG. 11B the outer circumferential surfaces of the annular portions 16, 16 may be larger than the outer diameter of the outer diameter side projection 31 (roller holding portion 18). Accordingly, it is possible to increase the strength of the annular portions 16, 16 while ensuring the proper opening width of the cylindrical roller 13.

Further, in these modifications, each of the both axial end portions of the column portion 17 includes an inclined surface 17c which connects an outer circumferential surface of the column portion 17 to each of the outer circumferential surfaces of the annular portions 16, 16, and the strength of the column portion 17 can also be increased by increasing the thickness of the column portion 17 by the inclined surfaces 17c.

Figure 12:
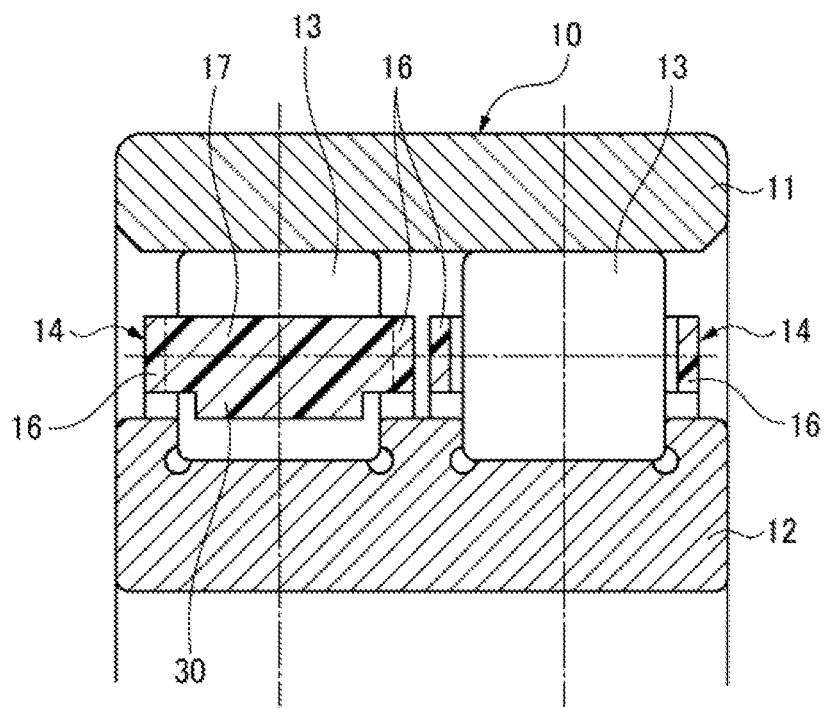
FIG. 12 is a cross-sectional view of a main part of a cylindrical roller bearing according to a tenth modification of the present invention.

Further, the present invention is not limited to a single-row cylindrical roller bearing, and may be applied to a double-row cylindrical roller bearing as shown in FIG. 12.

This application is based on Japanese Patent Application No. 2016-221736 filed on Nov. 14, 2016, the entire contents of which are incorporated herein by reference.

REFERENCE SIGNS LIST 10 cylindrical roller bearing
11 outer ring
11a outer ring raceway surface
12 inner ring
12a inner ring raceway surface
13 cylindrical roller
14 cage (resin cage for cylindrical roller bearing)
15 pocket portion
16 annular portion
17 column portion
17a axially intermediate portion of column portion
17b axial end portion of column portion
18 roller holding portion
19a first flat surface
19b circular arc surface
19c circular arc surface
19d tapered surface
20 lubricating reservoir
PCD pitch circle diameter of roller

The invention claimed is:

1. A cylindrical roller bearing comprising:
an outer ring having an outer ring raceway surface formed on an inner circumferential surface;
an inner ring having an inner ring raceway surface formed on an outer circumferential surface and a flange portion formed on an axial end portion of the inner ring raceway surface;
a plurality of cylindrical rollers rollably disposed between the outer ring raceway surface and the inner ring raceway surface; and
a resin cage which is used in a roller guide type, which includes a pair of annular portions and a plurality of column portions axially connecting the pair of annular portions, and which forms a plurality of pocket portions rotatably holding the plurality of cylindrical rollers respectively,
wherein the column portions of the cage includes roller holding portions which restrain the cylindrical roller on an outer diameter side and an inner diameter side thereof,
wherein the roller holding portions are formed such that a radial movement amount of the cage with respect to the cylindrical roller from a state where a revolution center of the cylindrical roller coincides with an axial center of the cage is configured so that an outer diameter side movement amount<an inner diameter side movement amount, and an outer diameter side opening width of the pocket portion>an inner diameter side opening width of the pocket portion, and
wherein the column portion includes an inner diameter side protrusion which protrudes to an inner diameter side than inner circumferential surfaces of the annular portions and which configures the roller holding portions.

2. The cylindrical roller bearing according to claim 1, wherein sums A+L and B+L of respective distances A and B from both axial end surfaces of the pocket portion to the inner diameter side protrusion and a width L of the inner diameter side protrusion are respectively shorter than an axial width C of the cylindrical roller.

3. The cylindrical roller bearing according to claim 1, wherein an inner surface of the roller holding portion is configured in a concave shape with a single circular arc.

4. The cylindrical roller bearing according to claim 1, wherein a flat surface passing through a pitch circle diameter position of the cylindrical roller is formed on an inner surface of the roller holding portion, and a concave circular arc surface or a tapered surface inclined with respect to the flat surface is formed on an outer diameter side and an inner diameter side of the flat surface.

5. The cylindrical roller bearing according to claim 4, wherein the concave arc surface is formed on the outer diameter side and the inner diameter side of the flat surface, and
wherein a curvature radius of the circular arc surface on the inner diameter side is larger than a curvature radius of the circular arc surface on the outer diameter side.

* * * * *